(12) United States Patent
Takada (10) Patent No.: US 9,307,245 B2
(45) Date of Patent: Apr. 5, 2016

(54) MOVING IMAGE ENCODING DEVICE (71) Applicant: NEC Corporation, Minato-ku, Tokyo (JP)

(72) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,053

(22) PCT Filed: Jul. 29, 2013

(86) PCT No.: PCT/JP2013/004583
§ 371 (c)(1),
(2) Date: Mar. 18, 2015

(87) PCT Pub. No.: WO2014/045507
PCT Pub. Date: Mar. 27, 2014

(65) Prior Publication Data
US 2015/0249824 A1 Sep. 3, 2015

(30) Foreign Application Priority Data

Sep. 19, 2012 (JP) .................................. 2012-205389

(51) Int. Cl.
*G06K 9/46* (2006.01)
*H04N 19/107* (2014.01)
*H04N 19/17* (2014.01)
*H04N 19/507* (2014.01)

(52) U.S. Cl.
CPC ............. *H04N 19/107* (2014.11); *H04N 19/17* (2014.11); *H04N 19/507* (2014.11)

(58) Field of Classification Search
CPC ....... H04N 5/2259; H04N 7/106; H04N 7/18; H04N 7/17318; H04N 21/2343; H04N 21/658; H04N 21/2381; H04N 21/4781; H04N 21/6587; H04N 21/6125; H04N 21/6377; H04N 21/23439; H04N 21/2142; H04N 21/266; A63F 13/12; A63F 13/10; H04L 65/605; H04L 65/403; H04L 65/80; H04L 65/608; H04L 65/60
USPC ......................................................... 382/232
See application file for complete search history.

(56) References Cited

U.S. PATENT DOCUMENTS 5,130,797 A * 7/1992 Murakami et al. ........ 375/240.16
2005/0196043 A1 * 9/2005 Jung et al. .................... 382/176

FOREIGN PATENT DOCUMENTS

JP 2002-051221 A 2/2002
JP 2002-204459 A 7/2002
(Continued)

OTHER PUBLICATIONS

International Search Report for PCT Application No. PCT/JP2013/004583, mailed on Oct. 29, 2013.

*Primary Examiner* — Ali Bayat (57) ABSTRACT

An updated region encoding unit detects an updated region in a frame of an inputted image signal and encodes the updated region. A retransmission candidate tile extracting unit extracts from within a screen a tile which does not belong to an updated region in a current frame and which is a partial region transmitted after encoded with a quality equal to or less than a first quality. A character likelihood estimating unit, with respect to a tile extracted by the retransmission candidate tile extracting unit, calculates a likelihood value indicating likelihood that the tile is a character region. A character-likelihood-order intra update unit selects a tile in decreasing order of the likelihood value from among tiles extracted by the retransmission candidate tile extracting unit, and encodes the tile with a second quality which is higher than the first quality and transmits the result.

9 Claims, 7 Drawing Sheets

(56) References Cited

FOREIGN PATENT DOCUMENTS

| JP | 4035475 | B2 | 11/2004 |
|---|---|---|---|
| JP | 2004-350009 | A | 12/2004 |
| JP | 2005-197879 | A | 7/2005 |
| JP | 2008-085502 | A | 4/2008 |
| JP | 2009-194627 | A | 8/2009 |
| JP | 2010-206753 | A | 9/2010 |
| JP | 2011-109618 | A | 6/2011 |

* cited by examiner

| | | | | 124 ↓ | | | | |
|---|---|---|---|---|---|---|---|
| 3 | 3 | 9 | 9 | 9 | 9 | 3 | 3 |
| 3 | 9 | 9 | 9 | 9 | 9 | 3 | 3 |
| 9 | 9 | 2 | 2 | 2 | 2 | 9 | 9 |
| 9 | 9 | 3 | 3 | 3 | 3 | 9 | 9 |
| 9 | 9 | 3 | 3 | 3 | 3 | 9 | 9 |
| 9 | 9 | 9 | 9 | 9 | 9 | 9 | 9 |

FIG. 7

MOVING IMAGE ENCODING DEVICE

This application is a National Stage Entry of PCT/JP2013/004583 filed on Jul. 29, 2013, which claims priority from Japanese Patent Application 2012-205389 filed on Sep. 19, 2012, the contents of all of which are incorporated herein by reference, in their entirety.

TECHNICAL FIELD

The present invention relates to a moving image encoding device. More specifically, the present invention relates to a moving image encoding device which encodes a video image on a computer screen, a moving image encoding method, and a program.

BACKGROUND ART

In recent years, for the purpose of achieving prevention of leakage of information from a computer terminal device and facilitation of management of applications on the terminal, a thin client system has been introduced. A thin client system makes a server device execute all applications inputted into, outputted from and displayed at a terminal device and also makes the server device manage all generated files relating to the execution.

In such a thin client system, drawing data of an application program executed by the server device is transferred to a client terminal device through a network such as a LAN, and displayed on the screen of the terminal device. Therefore, when the amount of drawing data to be processed increases or when the number of terminal devices connected to the server device increases, the load on the server device for transferring the drawing data to the terminal devices increases, and problems such as deterioration of response time and considerable limitation of the number of connected terminal devices arise.

Thus, a method of encoding and transmitting image data of a rectangular region including an updated region in an image is proposed as a first related technique relating to the present invention (for example, see Patent Document 1). According to this first related technique, in a case where an updated region in an image is only a partial region, the need for encoding and transmitting the whole image is eliminated, and encoding and transmitting only image data of the partial region is needed. Consequently, the amount of data to be transmitted can be reduced.

On the other hand, it is known to, when transmitting and/or receiving image data via a communication network, encode the image data in order to compress the amount of the data (for example, see Patent Document 2).

When irreversible transformation such as quantization is used in data compression, the quality of an image decoded on the reception side may deteriorate as compared with the quality of the original image on the transmission side. Also, in a case where a data loss or a transmission error occurs in a communication path and so on, the quality of an image on the reception side may deteriorate. In order to suppress propagation of image deterioration to a succeeding frame, resulting from the abovementioned things, a method of periodically inserting a signal of intra update (intra refresh) when transmitting a video image is devised. In general, in intra update, a method of dividing a frame into a plurality of partial regions (tiles) and transmitting little by little is used because encoding the whole frame leads to considerable increase of the amount of codes.

For example, it is proposed as a third related technique relating to the present invention to, after transmitting the codes of an updated region, perform intra update while circulating among low-quality tiles, within the range of a surplus amount of codes that can be transmitted (for example, see Patent Document 3). Consequently, even when the area of a drawing updated region of a frame varies largely, it is possible, by changing the area of a target region for intra update, to achieve a high image quality while sufficiently utilizing the surplus band. For example, with respect to a frame with no difference or a frame in which the area of a drawing updated region is small, it is possible to perform intra update through the most tiles that can be held in the surplus band. Moreover, by devising to preferentially circulate among tiles of a region encoded with low image quality or tiles having not been refreshed for a long period, it is possible to shorten a period that the low-quality tiles remain in the screen.

On the other hand, it is proposed as a fourth related technique relating to the present invention to encode an updated region after undergoing motion compensation as an image (for example, see Patent Document 4).

Further, it is proposed as a fifth related technique relating to the present invention to encode a block including a character region with high image quality (for example, see Patent Document 5). The fifth related technique reduces deterioration of the quality of character information by updating a quantization coefficient in a character region which requires sharpness in a moving image, separately from a quantization coefficient in the other region, so that the quantization coefficient in the character region becomes equal to or less than a predetermined threshold when the quantization coefficient in the character region is larger than the threshold.

Further, it is proposed as a sixth related technique relating to the present invention to read out a video signal per macroblock from a frame buffer and, when the while level is high in this macroblock, when data exists in an adjacent block, or when the result from a median filter shows continuity, determine as a caption (a character region) (for example, see Patent Document 6).

Patent Document 1: Japanese Unexamined Patent Application Publication No. 2008-085502
Patent Document 2: Japanese Patent Publication No. 004035475
Patent Document 3: Japanese Unexamined Patent Application Publication No. 2010-206753
Patent Document 4: Japanese Unexamined Patent Application Publication No. 2009-194627
Patent Document 5: Japanese Unexamined Patent Application Publication No. 2002-204459
Patent Document 6: Japanese Unexamined Patent Application Publication No. 2005-197879

In a case where the upper limit of the amount of outputted codes per frame is fixed, with respect to a frame in which the area of an updated region is large, it is difficult to encode the updated region with high quality, and therefore, there is no choice but to encode the updated region with low quality. For the region encoded with low quality and transmitted, intra update is performed while circulation among the low-quality tiles is performed within the range of a surplus amount of codes that can be transmitted in the following frames. In the infra update, as described in the third related technique, a tile which should be retransmitted with high quality is selected based on the quality of a tile and a period that a tile is not refreshed. Therefore, when the retransmission candidate tile includes a photograph region which is lower-quality than a character region or a photograph region which has not been refreshed for a longer period than a character region, a case where the photograph region is preferentially selected and the character region is left low-quality for a long time occurs.

However, in general, the level of quality has a larger effect on character information than on photograph information. This is because the meaning of character information largely varies depending on a difference in shape of the detail, whereas the meaning of photograph information can be roughly understood based on the outline alone.

As mentioned above, it is proposed as the fifth related technique relating to the present invention to encode a block including a character region with high quality. Thus, it is possible to apply the fifth related technique to the third related technique relating to the present invention and, when encoding an updated region, make the encoding quality in a character region higher than in the other region. However, in a case where an updated region is large in size and includes character regions at the high ratio, it is impossible, when the amount of all codes of the updated region exceeds the upper limit of an allowable code amount per frame, to achieve a high image quality in all of the character regions. As a result, in the same manner as mentioned above, a case where a character region is left low-quality for a long time occurs, and the legibility of characters in a video image decreases.

SUMMARY

An object of the present invention is to provide a moving image encoding device which solves the abovementioned problem that in a moving image encoding device which, after encoding and transmitting an updated region, performs intra update while circulating among low-quality tiles within the range of a surplus amount of codes that can be transmitted, the legibility of characters in a video image decreases.

A moving image encoding device as a first aspect of the present invention has: an updated region encoding unit detecting an updated region in a frame of an inputted image signal and encoding the updated region;

a retransmission candidate tile extracting unit extracting from within a screen a tile which does not belong to the updated region in a current frame, the tile being a partial region transmitted after encoded with a quality equal to or less than a first quality;

a character likelihood estimating unit, with respect to the tile extracted by the retransmission candidate tile extracting unit, calculating a likelihood value indicating likelihood that the tile is a character region; and a character-likelihood-order intra update unit selecting the tile in decreasing order of the likelihood value from among the tiles extracted by the retransmission candidate tile extracting unit, and encoding the tile with a second quality which is higher than the first quality and transmitting a result.

Further, a moving image encoding method as a second aspect of the present invention includes:

detecting an updated region in a frame of an inputted image signal and encoding the updated region;

extracting from within a screen a tile which does not belong to the updated region in a current frame, the tile being a partial region transmitted after encoded with a quality equal to or less than a first quality;

with respect to the extracted tile, calculating a likelihood value indicating likelihood that the tile is a character region; and selecting the tile in decreasing order of the likelihood value from among the extracted tiles, and encoding the tile with a second quality which is higher than the first quality and transmitting a result.

Further, a computer program as a third aspect of the present invention includes instructions for causing a computer to function as:

an updated region encoding unit detecting an updated region in a frame of an inputted image signal and encoding the updated region;

a retransmission candidate tile extracting unit extracting from within a screen a tile which does not belong to the updated region in a current frame, the tile being a partial region transmitted after encoded with a quality equal to or less than a first quality;

a character likelihood estimating unit, with respect to the tile extracted by the retransmission candidate tile extracting unit, calculating a likelihood value indicating likelihood that the tile is a character region; and a character-likelihood-order intra update unit selecting the tile in decreasing order of the likelihood value from among tiles extracted by the retransmission candidate tile extracting unit, and encoding the tile with a second quality which is higher than the first quality and transmitting a result.

According to the present invention, it is possible to increase the legibility of characters in a video image in a short frame period.

EXEMPLARY EMBODIMENTS

Next, an exemplary embodiment of the present invention will be described in detail referring to the drawings.

[First Exemplary Embodiment]

Figure 1:
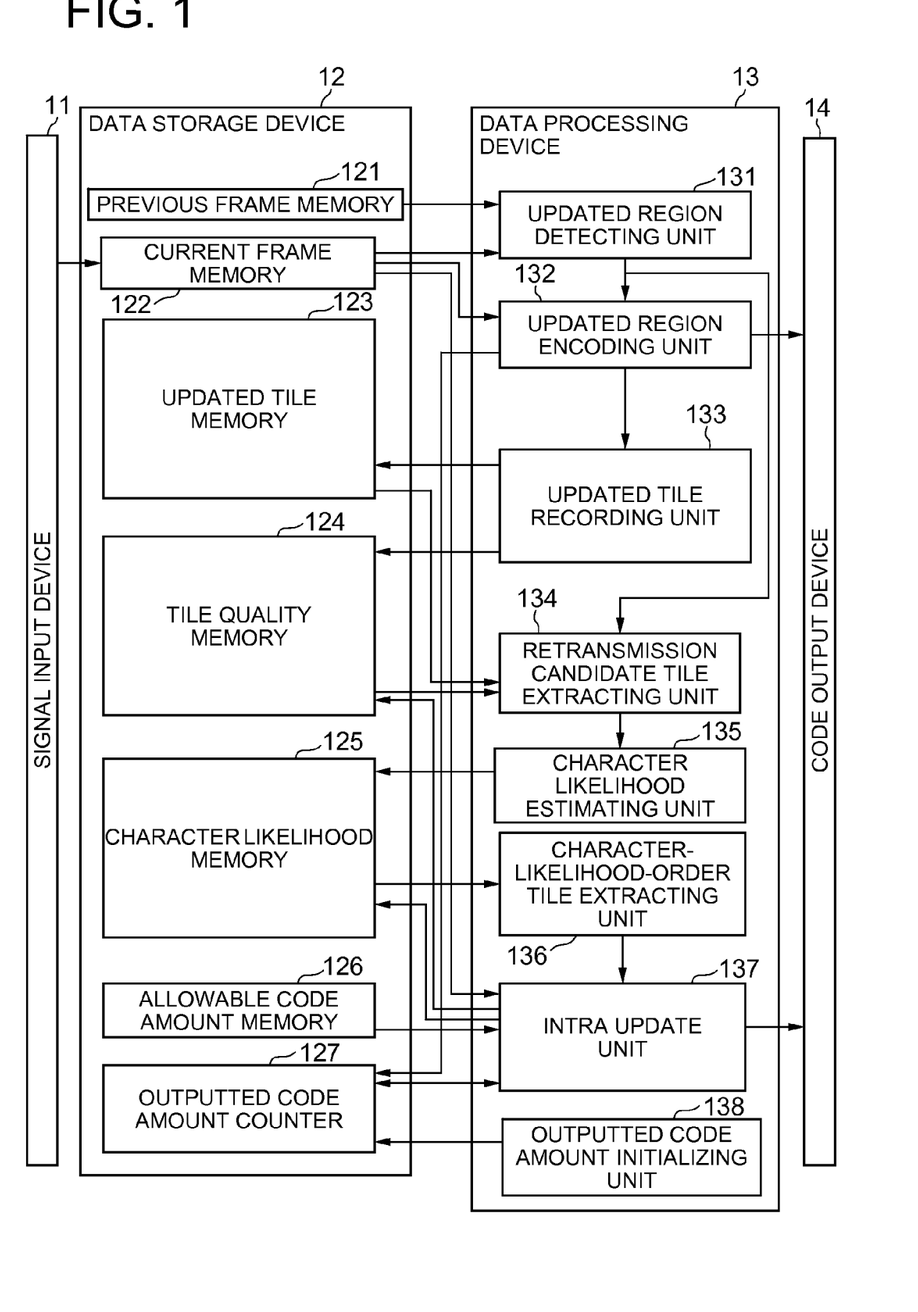
FIG. 1 is a block diagram of a video signal encoding device according to an exemplary embodiment of the present invention.

Referring to FIG. 1, a first exemplary embodiment of the present invention includes a signal input device 11, a data storage device 12, a data processing device 13 which operates under program control, and a code output device 14.

[Description of Configuration]

The signal input device 11 is a device for inputting a video signal. For example, the signal input device 11 captures analog or digital signals of a color video image on a display screen of a computer which is not shown in the drawings, and stores the result into the data storage device 12. The captured video signal of one screen is referred to as a frame or screen data.

The code output device 14 is configured by a storage device like a magnetic disk device, a communication device or the like, which stores or transmits code information obtained by encoding by the data processing device 13.

The data storage device 12 includes a previous frame memory 121, a current frame memory 122, an updated tile memory 123, a tile quality memory 124, a character likelihood memory 125, an allowable code amount memory 126, and an outputted code amount counter 127.

The previous frame memory 121 holds one or more frames inputted in the past.

The current frame memory 122 holds one frame that has been most recently inputted.

The updated tile memory 123 divides a frame into tiles and, for each of the tiles as a result of the division, holds data showing whether or not a difference is detected between a previous frame and a current frame. A tile in which a difference is detected is referred to as an updated tile.

The tile quality memory 124 stores, for each tile, data indicating quality with which the latest encoding is performed.

The character likelihood memory 125 stores, for a retransmission candidate tile, a likelihood value indicating the likelihood that the tile is a character region.

The allowable code amount memory 126 stores the upper limit of the amount of codes that can be outputted in a current frame.

The outputted code amount counter 127 stores the amount of codes already outputted in a current frame.

The data processing device 13 includes an updated region detecting unit 131, an updated region encoding unit 132, an updated tile recording unit 133, a retransmission candidate tile extracting unit 134, a character likelihood estimating unit 135, a character-likelihood-order tile extracting unit 136, an intra update unit 137, and an outputted code amount initializing unit 138. The respective units can be realized by execution of a program (not shown in the drawings) stored in the data storage device 12 by the data processing device 13.

The updated region detecting unit 131 retrieves data of a previous frame and data of a current frame from the previous frame memory 121 and the current frame memory 122, respectively, compares pixel values between the frames, and detects a region where there is a change in pixel value, namely, an updated region. Moreover, the updated region detecting unit 131 notifies coordinate information of the updated region to the updated region encoding unit 132 and the retransmission candidate tile extracting unit 134.

When the coordinate information of the updated region is notified by the updated region detecting unit 131, the updated region encoding unit 132 retrieves pixel data at the notified coordinates from the current frame memory 122, encodes the pixel data, and outputs the result to the code output device 14. For example, in the abovementioned encoding, a quality parameter in encoding is regulated so that the sum of the code amounts of all updated regions falls within a value stored in the allowable code amount memory 126. Moreover, the updated region encoding unit 132 finds a tile which overlaps the updated region, and notifies the coordinates of the tile to the updated tile recording unit 133. At the same time, the updated region encoding unit 132 notifies a quality parameter in encoding of the updated region to the updated tile recording unit 133. Furthermore, the updated region encoding unit 132 causes the outputted code amount counter 127 to accumulate the amount of outputted codes in encoding of the updated region.

As a method for encoding the updated region, for example, JPEG can be used. As a quality parameter in the encoding, the Q parameter of JPEG can be used. In a JPEG image, the legibility of characters is lower as the Q parameter is smaller, whereas the readability of characters is higher as the Q parameter is larger.

Upon notification of the coordinate information of the updated tile by the updated region encoding unit 132, the updated tile recording unit 133 rewrites data of the corresponding tile stored in the updated tile memory 123 to change the tile to the updated state. Moreover, when the quality parameter of the updated tile is notified by the updated region encoding unit 132, the updated tile recording unit 133 writes the notified quality parameter as the quality value of the corresponding tile stored in the tile quality memory 124.

The retransmission candidate tile extracting unit 134 refers to the updated tile memory 123 and the tile quality memory 124, and extracts a tile which does not correspond to the updated tile and which has a quality equal to or less than a predetermined value (i.e., a retransmission-needed quality) from among the tiles in the screen. The extracted tile is notified as a retransmission candidate tile to the character likelihood estimating unit 135.

For each retransmission candidate tile notified by the retransmission candidate tile extracting unit 134, the character likelihood estimating unit 135 calculates an index value, namely, a likelihood value indicating the likelihood that the tile is a character region, and writes the calculated likelihood value into the character likelihood memory 125. The character likelihood estimating unit 135, for example, finds edge strength for each pixel and regards a variance value of the edge strength in the tile as a likelihood value indicating the likelihood that the tile is a character region. In general, because a pixel with very high edge strength (the border between characters and background) and a pixel with very low edge strength (a monochromatic background) are mixed in a character region, the variance value of the edge strength takes a large value. Therefore, the variance value of the edge strength is preferable as the likelihood value indicating the likelihood of a character region.

The character-likelihood-order tile extracting unit 136 refers to the character likelihood memory 125, and extracts retransmission candidate tiles in the decreasing order of the likelihood value. The extracted tiles are notified as retransmission tiles to the intra update unit 137.

The intra update unit 137 sequentially encodes the retransmission tiles notified by the character-likelihood-order tile extracting unit 136 with a parameter of higher quality than a predetermined quality (i.e., with an intra update quality). Herein, it is assumed that a higher value than the abovementioned retransmission-needed quality is set as the intra update quality. Moreover, every time encoding one of the retransmission tiles, the intra update unit 137 stores the code amount of the tile into the outputted code amount counter 127. Then, in a case where the result of accumulation of the code amounts does not exceed the value of the allowable code amount memory 126, the intra update unit 137 outputs the code of the retransmission tile to the code output device 14. Moreover, for the retransmission tile whose code has been outputted, the intra update unit 137 rewrites the corresponding tile stored in the tile quality memory 124 with the value of the intra update quality. Furthermore, the intra update unit 137 deletes the corresponding tile from the retransmission candidate tiles stored in the character likelihood memory 125.

In the case of using JPEG as a method for encoding an updated region and using the Q parameter of JPEG as a quality parameter, experientially, it is possible to set a Q parameter which makes it possible to secure sufficient legibility of characters as the abovementioned intra update quality. Consequently, it is possible to preferentially encode a character region having been encoded with a low Q parameter, with a Q parameter which secures high character legibility and update the result to early increase character legibility for the user.

The outputted code amount initializing unit 138 initializes the value of the outputted code amount counter to 0 every time frame processing starts.

[Description of Operation]

Figure 2:
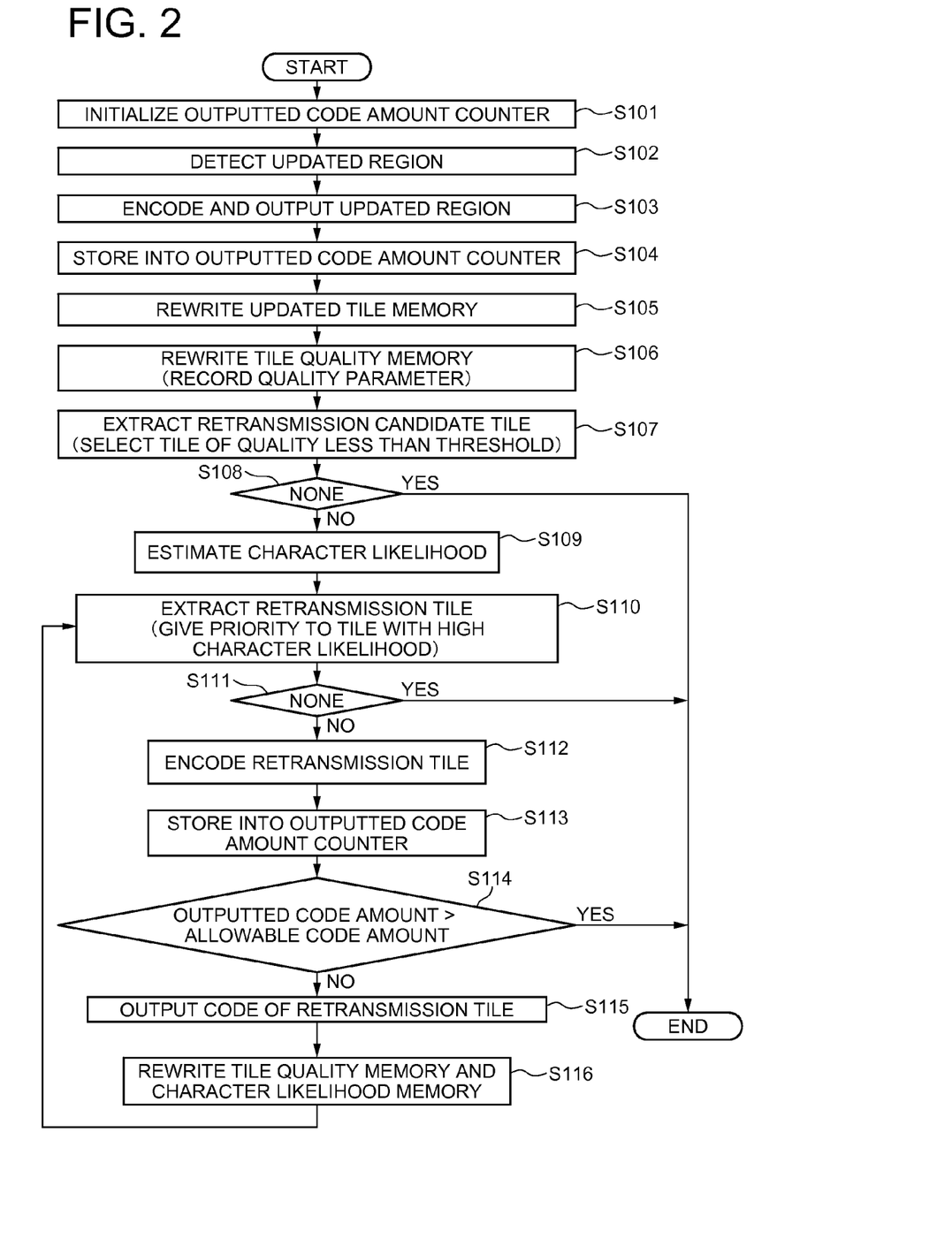
FIG. 2 is a flowchart showing the flow of a process executed by the video signal encoding device according to the exemplary embodiment of the present invention.

Referring to the block diagram shown in FIG. 1 and the flowchart shown in FIG. 2, the behavior of the entire exemplary embodiment of the present invention will be described in detail.

Firstly, when processing of a frame starts, the outputted code amount initializing unit 138 initializes the value of the outputted code amount counter 127 to 0 (step S101).

Next, the updated region detecting unit 131 retrieves data of a previous frame from the previous frame memory 121 and retrieves data of a current frame from the current frame memory 122 to compare the pixel values of both the frames, and detects a region showing change in pixel value, namely, an updated region (step S102). The updated region detecting unit 131 then notifies coordinate information of the updated region to the updated region encoding unit 132 and the retransmission candidate tile extracting unit 134.

Next, when the coordinate information of the updated region is notified by the updated region detecting unit 131, the updated region encoding unit 132 retrieves pixel data at the coordinates from the current frame memory 122, encodes the pixel data, and outputs the result to the code output device 14 (step S103). At this step, the updated region encoding unit 132 regulates a quality parameter for the encoding so that the sum of encoding amounts in all updated regions does not exceed a value stored in the allowable code amount memory 126, for example. Moreover, the updated region encoding unit 132 notifies tile coordinates of a tile overlapping the updated region to the updated tile recording unit 133, and simultaneously, notifies the quality parameter used in encoding of the updated region to the updated tile recording unit 133.

Next, the updated region encoding unit 132 causes the outputted code amount counter 127 to accumulate the amount of outputted codes (step S104).

Next, when the coordinate information of the updated tile is notified by the updated region encoding unit 132, the updated tile recording unit 133 rewrites a corresponding tile stored in the updated tile memory 123 so as to change to the updated state (step S105).

Figure 3:
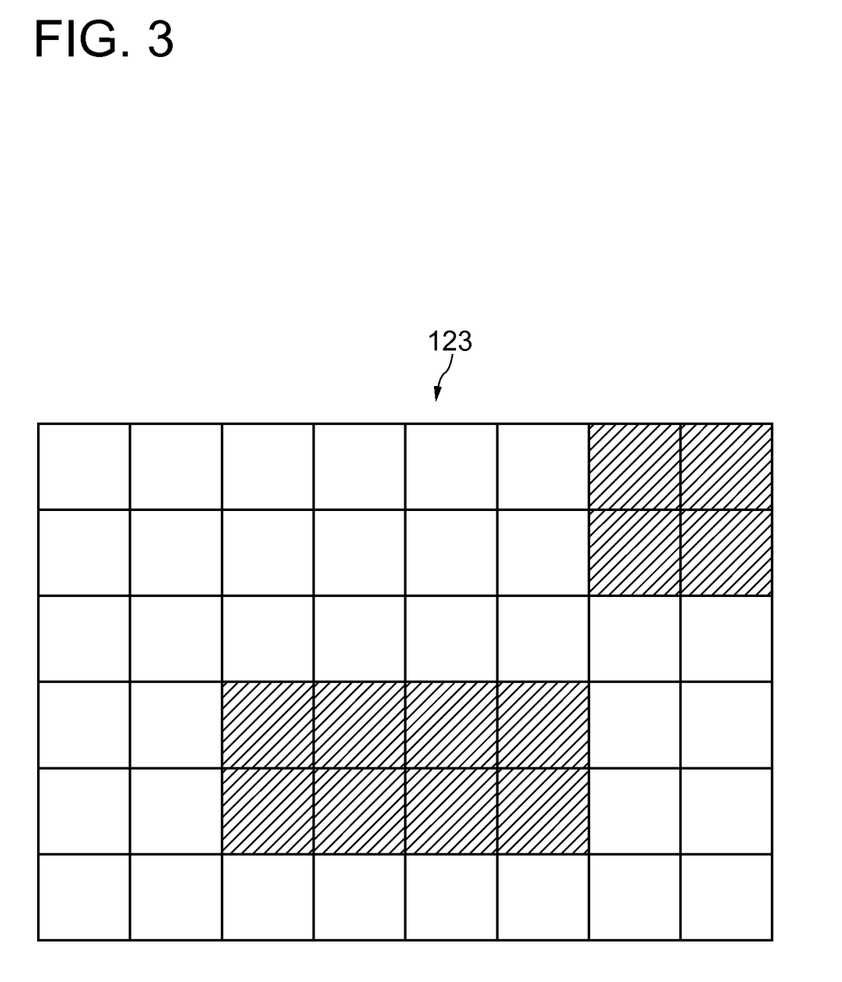
FIG. 3 is a view showing an example of the state of an updated tile memory in the video signal encoding device according to the exemplary embodiment of the present invention.

FIG. 3 shows an example of the state of the updated tile memory 123. The updated tile memory 123 is a memory showing the presence or absence of update of each tile in the frame. In FIG. 3, shaded tiles represent tiles in the updated state.

Next, when the coordinate information of the updated tile and the quality parameter are notified by the updated region encoding unit 132, the updated tile recording unit 133 writes the notified quality parameter as a quality value of a corresponding tile stored in the tile quality memory 124 (step S106).

Figure 4:
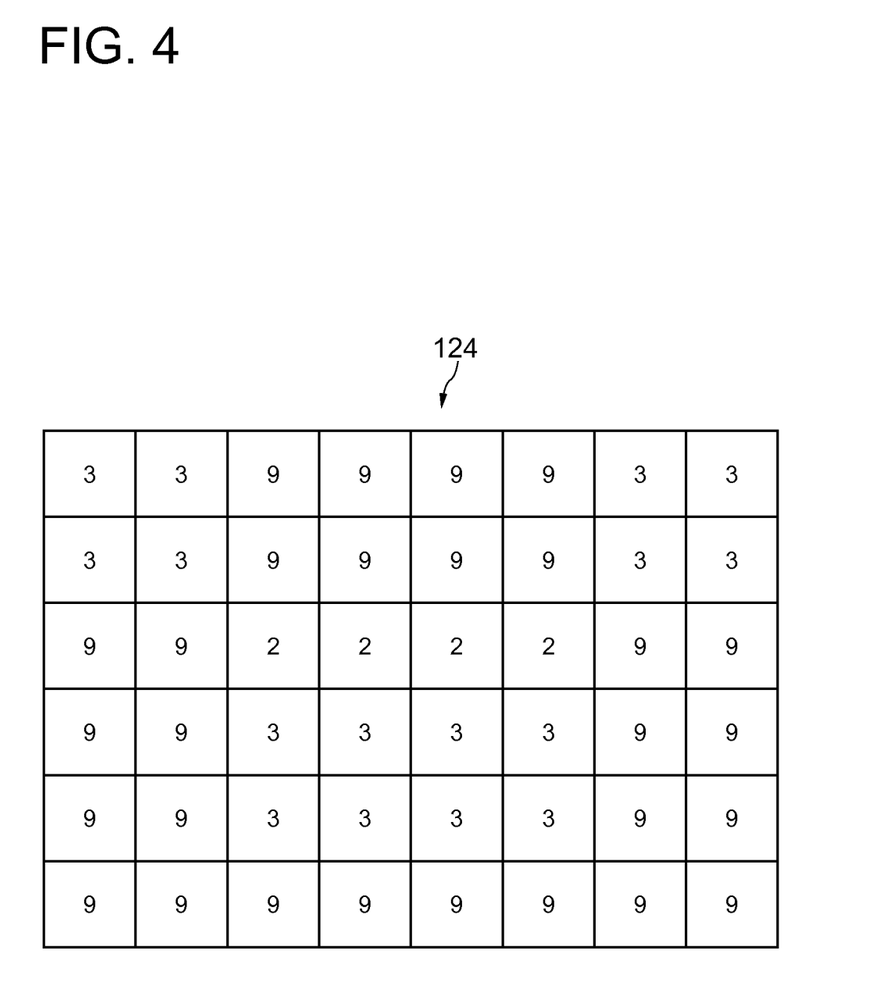
FIG. 4 is a view showing an example of the state of a tile quality memory in the video signal encoding device according to the exemplary embodiment of the present invention.

FIG. 4 shows an example of the state of the tile quality memory 124. The tile quality memory 124 is a memory showing the quality values of the respective tiles in the frame. Numerical values such as 2, 3 and 9 in FIG. 4 represent the quality values of the respective tiles.

Herein, a larger value represents a higher quality value. In FIG. 4, it is assumed that an updated region in a current frame has been encoded with a quality value=3, so that the numerical value 3 is written as the quality value in an updated tile overlapping the updated region in the current frame (the shaded tiles in the updated tile memory 123 in FIG. 3).

Next, the retransmission candidate tile extracting unit 134 receives the coordinate information of the updated region from the updated region detecting unit 131 and, referring to the updated tile memory 123 and the tile quality memory 124, extracts an updated tile which does not correspond to the updated region of the current frame and which has a quality equal to or less than a predetermined value, as a retransmission candidate tile, from within the screen (step S107).

Next, the retransmission candidate tile extracting unit 134 determines whether or not a retransmission candidate tile is extracted (step S108) and, in a case where not extracted (Yes step S108), ends the processing of the frame. In a case where extracted (No at step S108), the retransmission candidate tile extracting unit 134 notifies the extracted retransmission candidate tile to the character likelihood estimating unit 135.

Next, for each retransmission candidate tile notified by the retransmission tile extracting unit 134, the character likelihood estimating unit 135 calculates a likelihood value indicating the likelihood that the tile is a character region, and writes whether or not the tile is a retransmission candidate tile and the calculated likelihood value into the character likelihood memory 125 (step S109).

Figure 5:
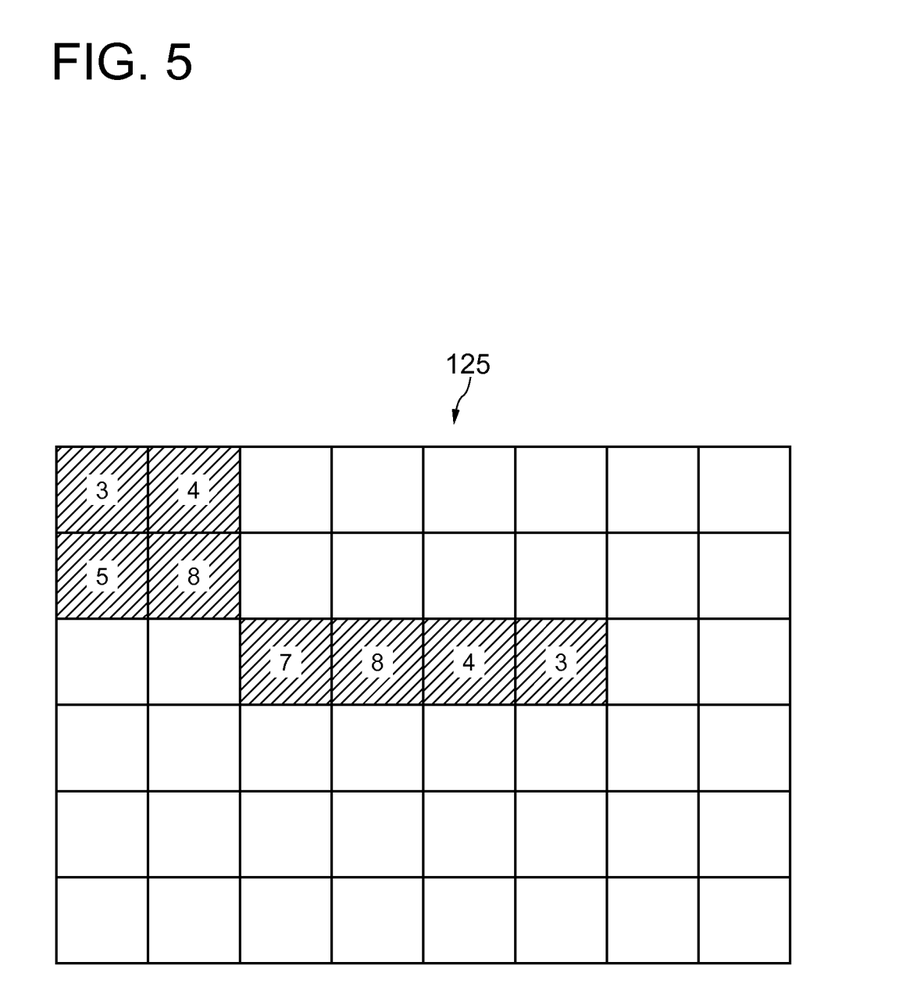
FIG. 5 is a view showing an example of the state of a character likelihood memory in the video signal encoding device according to the exemplary embodiment of the present invention.

FIG. 5 shows an example of the state of the character likelihood memory 125. In this example, tiles with a predetermined value (in this case, 3) or less (except the updated tiles) in the tile quality memory 124 are extracted as retransmission candidate tiles (shaded tiles in FIG. 5). Moreover, character likelihood values (3 to 8) calculated for the respective retransmission candidate tiles are stored together.

Next, the character-likelihood-order tile extracting unit 136 refers to the character likelihood memory 125 and extracts a retransmission candidate tile with the largest character likelihood as a retransmission tile (step S110).

In FIG. 5, retransmission tiles are extracted in order from a tile having the largest character likelihood value (8). In a case where a plurality of tiles have the same character likelihood value, a retransmission tile is determined by any method (for example, one appearing earlier or later in scanning order is selected). Herein, it is assumed that one appearing earlier in scanning order is selected.

Next, the character-likelihood-order tile extracting unit 136 determines whether a retransmission tile is not extracted (that is, any more retransmission candidate tile is not left) (step S111). In a case where not extracted (Yes at step S111), the processing of the frame ends. In a case where extracted (No at step S111), step S112 and the following steps are executed.

Next, the intra update unit 137 encodes the retransmission tile notified by the character-likelihood-order tile extracting unit 136 with a parameter of a higher quality than a predetermined quality (i.e, with an intra update quality) (step S112).

Next, every time encoding one retransmission tile, the intra update unit 137 causes the outputted code amount counter 127 to accumulate the code amount of the tile (step S113).

The intra update unit 137 determines whether or not the accumulation result exceeds the value of the allowable code amount memory 126 (step S114). In a case where exceeds (Yes at step S114), the processing of the frame ends. In a case where not exceed (No at step S114), step 115 and the following steps are executed.

Next, the intra update unit 137 outputs the code of the retransmission tile to the code output device 14 (step S115).

Finally, regarding the retransmission tile whose code has been outputted, the intra update unit 137 rewrites the corresponding tile stored in the tile quality memory 125 to change the value thereof to the value of the intra update quality (e.g., 9). Moreover, the intra update unit 137 deletes the corresponding tile from the retransmission candidate tiles in the character likelihood memory 125. Upon end of the abovementioned processing, the processing returns to the step S110 and the processing is repeated.

Figure 6:
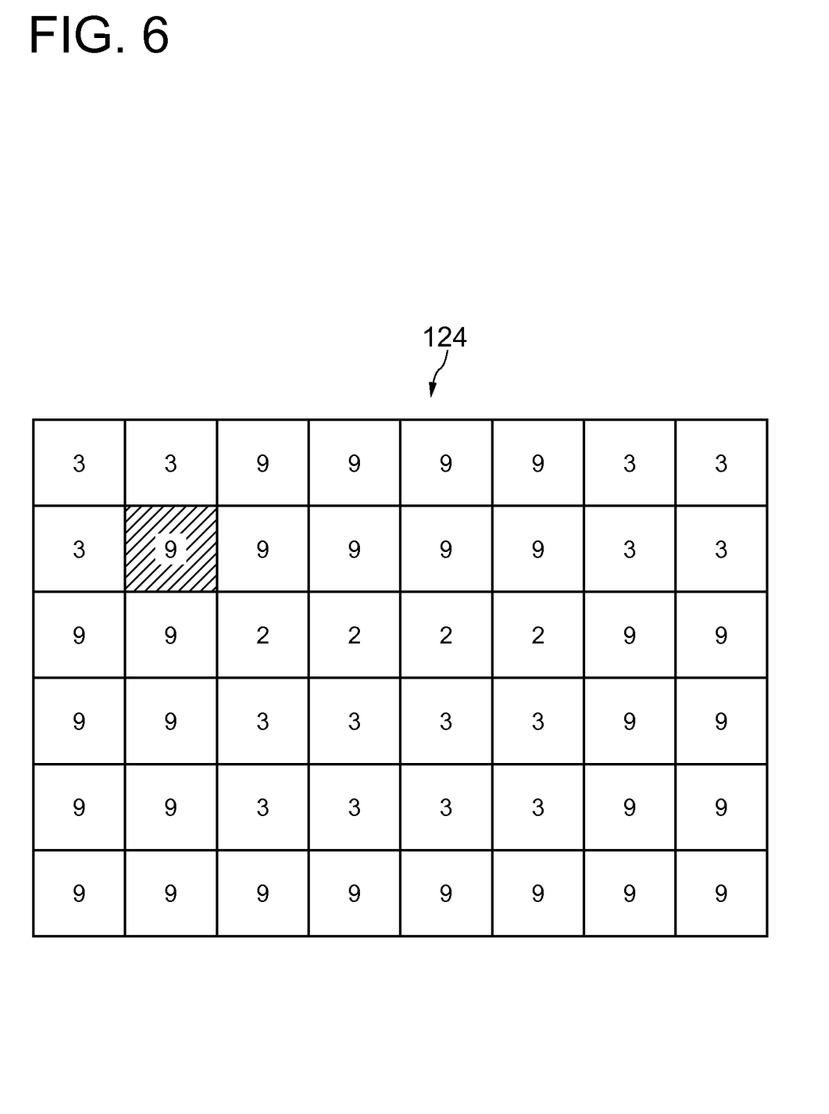
FIG. 6 is a view showing another example of the state of the tile quality memory in the video signal encoding device according to the exemplary embodiment of the present invention.
Figure 7:
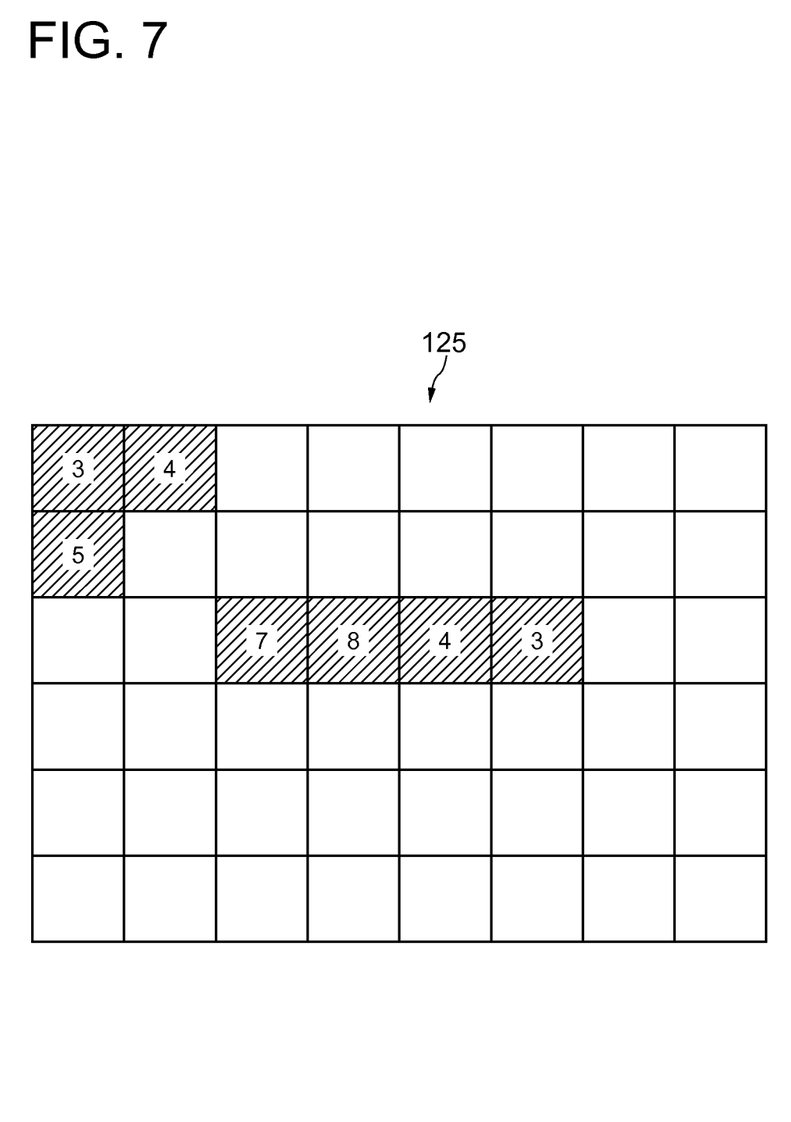
FIG. 7 is a view showing another example of the state of the character likelihood memory in the video signal encoding device according to the exemplary embodiment of the present invention.

As a result, a retransmitted tile in the tile quality memory 124 shown in FIG. 1 is written over to have a value of an intra update quality (in this case, 9) as shown by a shaded tile in FIG. 6. Moreover, for example, as shown in FIG. 7, every time one tile is retransmitted, a retransmission candidate tile corresponding to the retransmitted tile in the character likelihood memory 125 is deleted.

Thus, according to this exemplary embodiment, it is possible to increase the legibility of characters in a video image in a short frame period. This is because it is possible to perform intra update in order from a character region which is important for understanding of the content among low-quality regions, and increase the image quality.

Further, according to this exemplary embodiment, calculation of a likelihood value representing the likelihood of a character region is performed instead of either-or determination whether or not a retransmission candidate tile is a character region. Therefore, it is possible to retransmit in order by giving priority to a retransmission candidate tile with a larger likelihood value, that is, a retransmission candidate tile with a higher possibility of a character region.

[Other Exemplary Embodiments]

In the exemplary embodiment described above, the updated tile recording unit 133 writes the value of a notified quality parameter into the tile quality memory 124 without changing. However, in another exemplary embodiment of the present invention, when any quality value has already been written with respect to a corresponding tile, the updated tile recording unit 133 may write a lower value between the value of a notified quality parameter and the quality value having already been written, as the quality value of the corresponding tile. Consequently, for example, even if a tile is encoded with low quality once and thereafter only part of the tile is encoded with high quality, it is possible to include the tile as a tile in which a low-quality portion is left into intra update candidates.

Further, in the exemplary embodiment described above, every time encoding one tile, the intra update unit 137 searches for a tile with the largest character likelihood from among the remaining retransmission candidate tiles. However, in another exemplary embodiment of the present invention, the intra update unit 137 may first sort retransmission candidate tiles in decreasing order of character likelihood and select a tile in order from among the sorted retransmission candidate tiles. Consequently, it is possible to omit the searching process executed every time one tile is encoded in the exemplary embodiment described above.

Further, in the exemplary embodiment described above, the character-likelihood-order tile extracting unit 136 extracts one by one tiles with larger character likelihood. However, the same effect can be obtained by another method as far as a tile with larger character likelihood is preferentially retransmitted. Therefore, in another exemplary embodiment of the present invention, for example, the character-likelihood-order tile extracting unit 136 may set several-stage thresholds, apply the thresholds in the decreasing order, and collectively extract tiles with character likelihood exceeding the respective thresholds. For example, it is assumed that regarding the character likelihood memory 125 shown in FIG. 5, the character-likelihood-order tile extracting unit 136 uses three thresholds including 6, 3 and 0 in this order. The character-likelihood-order tile extracting unit 136 firstly selects three tiles in total including two tiles with character likelihood 8 and one tile with character likelihood 7, as tiles with character likelihood exceeding the threshold 6, and notifies them to the intra update unit 137. Consequently, these three tiles are firstly made to be higher-quality and transmitted. In the next stage, the character-likelihood-order tile extracting unit 136 selects three tiles in total including one tile with character likelihood 5 and two tiles with character likelihood 4 as tiles with character likelihood exceeding the threshold 3, and notifies them to the intra update unit 137. Thus, a tile with higher character likelihood is preferentially made to be high-quality, and the object of the present invention is achieved.

Further, in the exemplary embodiment described above, as the condition for determination of end of processing by the intra update unit 137, it is used whether or not the amount of accumulated codes exceeds the allowable code amount. However, another condition may be used.

For example, in another exemplary embodiment of the present invention, by previously setting (storing) the upper limit number of tiles per frame, the intra update unit 137 may use it as the condition for end whether or not the number of transmitted tiles in a current frame is equal to or less than the abovementioned upper limit number of tiles.

Alternatively, in another exemplary embodiment of the present invention, by previously setting (storing) target time to complete the processing of a current frame, the intra update unit 137 may use it as the condition for end whether or not the current time is before the target time. For example, a clocking unit such as a timer for counting the elapsed time from a time point of start of the processing of a current frame is included and, after encoding of an updated region by the updated region encoding unit 132, the intra update unit 137 performs the encoding process as far as time clocked by the clocking unit is before the target end time.

Alternatively, in another exemplary embodiment of the present invention, it is possible to use any combination of a plurality of conditions, for example, whether or not the amount of accumulated codes exceeds the allowable code amount, whether or not the number of transmitted tiles in a current frame is equal to or less than the abovementioned upper limit number of tiles, and whether the current time is before the target time having been set.

Even if any of the abovementioned conditions for end is used, a tile with higher character likelihood is preferentially made to be high-quality under the given condition, and the object of the present invention is achieved.

The present invention is based upon and claims the benefit of priority from Japanese patent application No. 2012-205389, filed on Sep. 19, 2012, the disclosure of which is incorporated herein in its entirety by reference.

INDUSTRIAL APPLICABILITY

The present invention can be used for making a video image clear under limitation of a transmission band in a thin client system of screen transfer type. Also, the present invention can be applied to distribution of various video images including both characters and photographs, for example, digital signage of video distribution type.

DESCRIPTION OF REFERENCE NUMERALS

11 signal input device
12 data storage device
13 data processing device
14 code output device 121 previous frame memory
122 current frame memory
123 updated tile memory
124 tile quality memory
125 character likelihood memory
126 allowable code amount memory
127 outputted code amount counter
131 updated region detecting unit
132 updated region encoding unit
133 updated tile recording unit
134 retransmission candidate tile extracting unit
135 character likelihood estimating unit
136 character-likelihood-order tile extracting unit
137 intra update unit
138 outputted code amount initializing unit

The invention claimed is:

1. A moving image encoding device comprising:
at least one memory operable to store program instruction;
at least one processor operable to read said program instruction and configured by the program instruction to operate as:
an updated region encoding unit configured to detect an updated region in a frame of an inputted image signal and encode the updated region;
a retransmission candidate tile extracting unit configured to extract, from among a plurality of tiles which are partial portions of the frame, a tile which does not belong to the updated region in a current frame, the tile transmitted after encoded with a quality equal to or less than a first quality;
a character likelihood estimating unit, with respect to the tile extracted by the retransmission candidate tile extracting unit, configured to calculate a likelihood value indicating likelihood that the tile is a character region; and
a character-likelihood-order intra update unit configured to select the tile in decreasing order of the likelihood value from among the tiles extracted by the retransmission candidate tile extracting unit and, for transmission, encode the tile with a second quality which is higher than the first quality.

2. The moving image encoding device according to claim 1, wherein the character-likelihood-order intra update unit configured to perform the encoding of the tile so that a total amount of outputted codes in the current frame does not exceed a target amount of codes.

3. The moving image encoding device according to claim 1, wherein the character-likelihood-order intra update unit configured to select a predetermined number of the tiles or less.

4. The moving image encoding device according to claim 1, wherein the character-likelihood-order intra update unit configured to end the selection and encoding of the tile when it reaches end target time.

5. The moving image encoding device according to claim 1, wherein the character-likelihood-order intra update unit configured to perform the selection and encoding of the tile one by one.

6. The moving image encoding device according to claim 1, wherein the character-likelihood-order intra update unit configured to extract and encode all the tiles with the likelihood values exceeding a first threshold, and thereafter, extract all the tiles with the likelihood values exceeding a second threshold which is smaller than the first threshold and performs the encoding.

7. The moving image encoding device according to claim 1, wherein the character likelihood value estimating unit configured to obtain edge strength for each pixel in the frame and calculate a variance value of the edge strength in the tile as the likelihood value.

8. A moving image encoding method comprising:
detecting an updated region in a frame of an inputted image signal and encoding the updated region;
extracting, from among a plurality of tiles which are partial regions of the frame, a tile which does not belong to the updated region in a current frame, the tile transmitted after encoded with a quality equal to or less than a first quality;
with respect to the extracted tile, calculating a likelihood value indicating likelihood that the tile is a character region; and
selecting the tile in decreasing order of the likelihood value from among the extracted tiles and, for transmission, encoding the tile with a second quality which is higher than the first quality.

9. A non-transitory computer-readable medium storing a computer program comprising instructions for causing a computer to function as:
an updated region encoding unit configured to detect an updated region in a frame of an inputted image signal and encode the updated region;
a retransmission candidate tile extracting unit configured to extract, from among a plurality of tiles which are partial regions of the frame, a tile which does not belong to the updated region in a current frame, the tile transmitted after encoded with a quality equal to or less than a first quality;
a character likelihood estimating unit, with respect to the tile extracted by the retransmission candidate tile extracting unit, configured to calculate a likelihood value indicating likelihood that the tile is a character region; and
a character-likelihood-order intra update unit configured to select the tile in decreasing order of the likelihood value from among tiles extracted by the retransmission candidate tile extracting unit and, for the transmission, encode the tile with a second quality which is higher than the first quality.

* * * * *